US012812055B2

(12) United States Patent
Kojima

(10) Patent No.: US 12,812,055 B2

(45) Date of Patent: Nov. 24, 2026

(54) INFORMATION PROCESSING SYSTEM, METHOD OF CONTROLLING INFORMATION PROCESSING SYSTEM, INFORMATION PROCESSING APPARATUS, METHOD OF CONTROLLING INFORMATION PROCESSING APPARATUS, ELECTRONIC APPARATUS, METHOD OF CONTROLLING ELECTRONIC APPARATUS, AND STORAGE MEDIUM

(71) Applicant: CANON KABUSHIKI KAISHA, Tokyo (JP)

(72) Inventor: Ryoko Kojima, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 191 days.

(21) Appl. No.: 19/015,880

(22) Filed: Jan. 10, 2025

(65) Prior Publication Data

US 2025/0240378 A1 Jul. 24, 2025

(30) Foreign Application Priority Data

Jan. 19, 2024 (JP) ................................ 2024-006729

(51) Int. Cl.
*H04N 1/00* (2006.01)
*H04N 1/32* (2006.01)

(52) U.S. Cl.
CPC ..... *H04N 1/00973* (2013.01); *H04N 1/00244* (2013.01); *H04N 1/00408* (2013.01); (Continued)

(58) Field of Classification Search
CPC ........... H04N 1/00973; H04N 1/00244; H04N 1/00408; H04N 1/32662; H04N 2201/3204; H04N 2201/3212; H04N 1/4433
(Continued)

(56) References Cited

U.S. PATENT DOCUMENTS

| | | | | |
|---|---|---|---|---|
| 9,971,588 | B2 | 5/2018 | Tsuchiya et al. | |
| 2016/0057295 | A1* | 2/2016 | Miyazawa ......... | H04N 1/00244 358/1.14 |

(Continued)

FOREIGN PATENT DOCUMENTS

| | | | |
|---|---|---|---|
| JP | 2016162063 | A | 9/2016 |
| JP | 2020019238 | A | 2/2020 |

*Primary Examiner* — Allen H Nguyen

(74) *Attorney, Agent, or Firm* — Venable LLP

(57) ABSTRACT

An information-processing-system includes an electronic-apparatus and an information-processing-apparatus. The electronic-apparatus has: a display-control-unit that, in response to an operation for using a web service performed on the electronic-apparatus, checks permission-information and, in a case where a user has not granted consent, performs control so as to display a specific screen indicating that a permission for information transmission from the electronic-apparatus is required; and a recording-unit that records specific information indicating that the display-control-unit has displayed the specific screen. The information-processing-apparatus has: a reception-unit that receives state-information indicating a state of the electronic-apparatus; a control-unit that, in a case where state-information contains the specific information, performs control so as to perform a predetermined process for allowing the user to perform an operation on the information-processing-apparatus, the operation indicating whether to grant consent to a content of permission for the information transmission from the electronic-apparatus; and an acceptance-unit that accepts the operation indicating whether to grant consent to content of the permission.

16 Claims, 9 Drawing Sheets

(52) U.S. Cl.
CPC . *H04N 1/32662* (2013.01); *H04N 2201/3204* (2013.01); *H04N 2201/3212* (2013.01)

(58) Field of Classification Search
USPC .......................................................... 358/1.14
See application file for complete search history.

(56) References Cited

U.S. PATENT DOCUMENTS

| | | | | |
|---|---|---|---|---|
| 2019/0007404 | A1* | 1/2019 | Igari | G06F 21/608 |
| 2020/0045204 | A1* | 2/2020 | Niimoto | H04N 1/4426 |

* cited by examiner

| PERMISSION INFORMATION | VALUE |
|---|---|
| SERVICE PERMISSION | CONSENTED |
| ANALYSIS PERMISSION | NOT CONSENTED |
| PERMISSION VERSION | 2 |

FIG.9A

| PERMISSION INFORMATION | VALUE |
|---|---|
| TRANSMISSION PERMISSION | CONSENTED |

FIG.9B

| CONVERSION TABLE 1 | | ANALYSIS PERMISSION | |
|---|---|---|---|
| | | CONSENTED | NOT CONSENTED |
| SERVICE PERMISSION | CONSENTED | TRANSMISSION PERMISSION: CONSENTED | TRANSMISSION PERMISSION: CONSENTED |
| | NOT CONSENTED | TRANSMISSION PERMISSION: NOT CONSENTED | TRANSMISSION PERMISSION: NOT CONSENTED |

FIG.9C

| CONVERSION TABLE 2 | | ANALYSIS PERMISSION | |
|---|---|---|---|
| | | CONSENTED | NOT CONSENTED |
| SERVICE PERMISSION | CONSENTED | TRANSMISSION PERMISSION: CONSENTED | TRANSMISSION PERMISSION: NOT CONSENTED |
| | NOT CONSENTED | TRANSMISSION PERMISSION: NOT CONSENTED | TRANSMISSION PERMISSION: NOT CONSENTED |

FIG.9D

INFORMATION PROCESSING SYSTEM, METHOD OF CONTROLLING INFORMATION PROCESSING SYSTEM, INFORMATION PROCESSING APPARATUS, METHOD OF CONTROLLING INFORMATION PROCESSING APPARATUS, ELECTRONIC APPARATUS, METHOD OF CONTROLLING ELECTRONIC APPARATUS, AND STORAGE MEDIUM

BACKGROUND

Field

The present disclosure relates to an information processing system, a method of controlling an information processing system, an information processing apparatus, a method of controlling an information processing apparatus, an electronic apparatus, a method of controlling an electronic apparatus, and a storage medium.

Description of the Related Art

Heretofore, systems which transmit status information of an electronic apparatus to a server with its users' consent and provide services tailored to the electronic apparatus' status by analyzing the status information on the server have been widely used.

Japanese Patent Laid-Open No. 2020-019238 discloses a system which obtains consent to a permission for information transmission from the user of a multi-function peripheral and transmits its status information to servers to utilize it for services.

Also, Japanese Patent Laid-Open No. 2016-162063 discloses a system which, at the time of a software update, asks the user for permission for information transmission again due to adding of a function or functions.

SUMMARY

From a cost perspective, some electronic apparatuses only have small or simple displays. These apparatuses cannot provide sufficient display functionality to their users and therefore cannot fully display an adequate explanation for a permission to gather user information. For this reason, there are cases where a permission setting cannot be configured on the electronic apparatuses themselves. In such a case, an information processing apparatus which is an external apparatus other than the electronic apparatus (e.g., a smartphone) is sometimes utilized as an alternative tool to accept an operation that indicates the user's consent to the content of the permission on the display of the external apparatus. In a case where communication needs to be performed that requires consent to the content of a permission for information transmission or in another similar case, the electronic apparatus provides guidance by presenting a display indicating that consent to the content of the permission is required by using an error notification or another similar means.

However, there is a possibility that even if the user is notified on the electronic apparatus that consent to the content of the permission is required, the user may not know how to perform an operation that indicates their consent.

An information processing system according to an aspect of the present disclosure is an information processing system comprising an electronic apparatus and an information processing apparatus, in which the electronic apparatus has: a display control unit that, in response to the electronic apparatus accepting an operation for using a web service, checks permission information indicating whether a user has granted consent to a permission content and, in a case where the user has not granted consent, performs control so as to display a specific screen indicating that a permission for information transmission from the electronic apparatus is required; and a recording unit that records specific information indicating that the display control unit has displayed the specific screen, and the information processing apparatus has: a reception unit that receives state information indicating a state of the electronic apparatus; a control unit that, in a case where the state information contains the specific information, performs control so as to perform a predetermined process for allowing the user to perform an operation on the information processing apparatus, the operation indicating whether to grant consent to a content of the permission for information transmission from the electronic apparatus; and an acceptance unit that accepts the operation indicating whether to grant consent to the content of the permission.

Further features of the present invention will become apparent from the following description of exemplary embodiments with reference to the attached drawings.

BRIEF DESCRIPTION OF THE DRAWINGS

FIGS. 9A to 9D are examples of permission information to be held and examples of conversion of permission information.

DESCRIPTION OF THE EMBODIMENTS

An exemplary embodiment of the present disclosure will be described below with reference to the drawings. It is to be noted that the constituent elements described in the present embodiment merely represent an exemplary form of the present disclosure and are not intended to limit the scope of the present disclosure only to those.

In the following, an embodiment using an image processing apparatus as an electronic apparatus will be described. In the present embodiment, a permission version is assigned to each permission statement in order to manage updates of permission statements. The configuration is such that a latest version covers previous versions, and in a case of requesting consent to a permission from a user, the latest version of its permission statement (permission content) will be used.

In the present embodiment, a permission for information gathering is divided into a service permission and an analysis permission. The service permission is a permission to transmit information that is necessary for providing services. The analysis permission is a permission to transmit information that is not essential for providing the services so that the service providers can use it for user analysis. Hence, the user's consent is requested separately for the service permission and the analysis permission.

Figure 1:
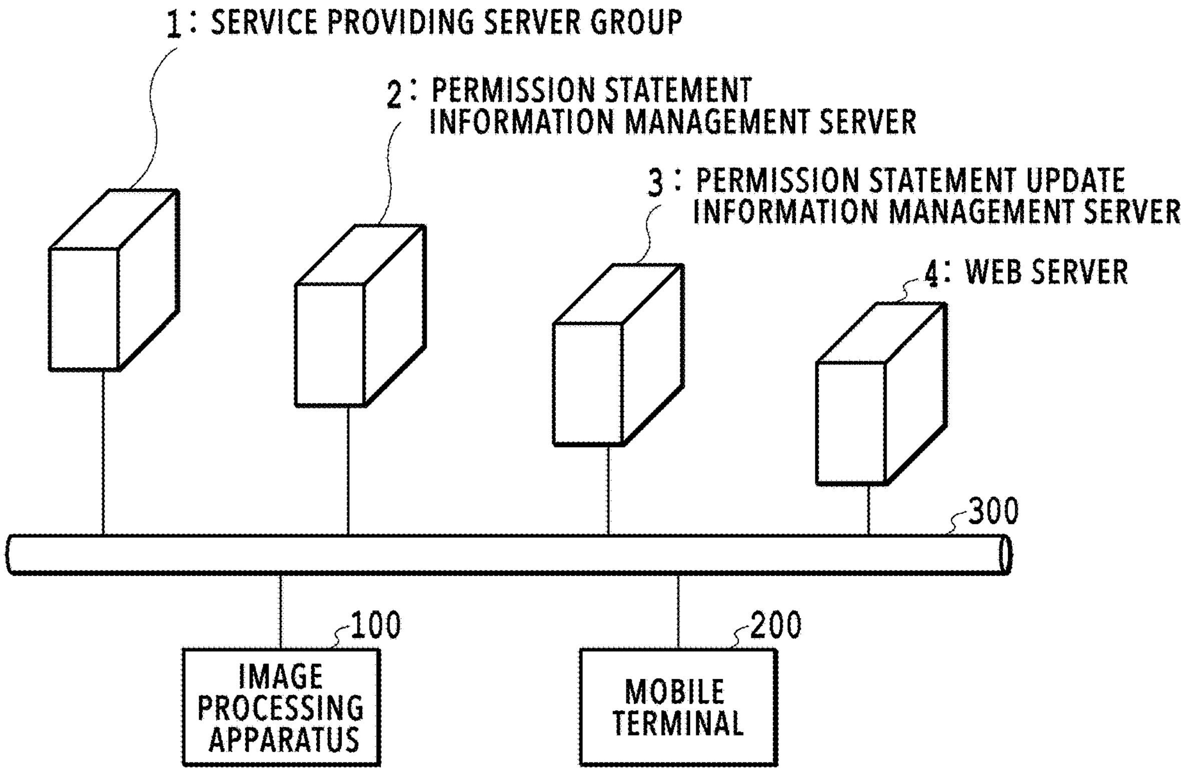
FIG. 1 is a configuration diagram of a system.

FIG. 1 is a configuration diagram illustrating a configuration of an entire information processing system. The information processing system has a server system for providing services (a service providing server group 1, a permission statement information management server 2 that manages information on the latest versions of permission statements, and a permission statement update information management server 3 that manages information on the updates of the permission statements). The information processing system also has an image processing apparatus 100, a web server 4, and a communication network 300. The service providing server group 1 represents servers for providing cloud services to the image processing apparatus 100. The cloud services include services such as printing image data on a cloud with the image processing apparatus 100, saving image data obtained by scanning with the image processing apparatus 100 on a cloud, and so on.

The permission statement information management server 2 manages the latest permission versions of permission statements. In a case where a permission statement for users to consent is changed due to addition of a function, revision of a law, or the like, the permission statement information management server 2 updates its latest permission version.

The permission statement update information management server 3 manages transmittable permission versions, which are permission versions required for information transmission, by country. The permission statement update information management server 3 also determines the country in which the image processing apparatus 100 is installed, and it returns the transmittable permission version of each of the service permission and the analysis permission corresponding to that country. In a case where a permission statement that requires the user's consent is changed due to addition of a function, revision of a law, or the like, the permission statement update information management server 3 updates information of the transmittable permission version in the server.

In the web server 4, latest permission statements are recorded by country. Incidentally, while the permission statement information management server 2 and the permission statement update information management server 3 are separately illustrated as an example of the embodiment in FIG. 1, they may be integrated.

Figure 2A:
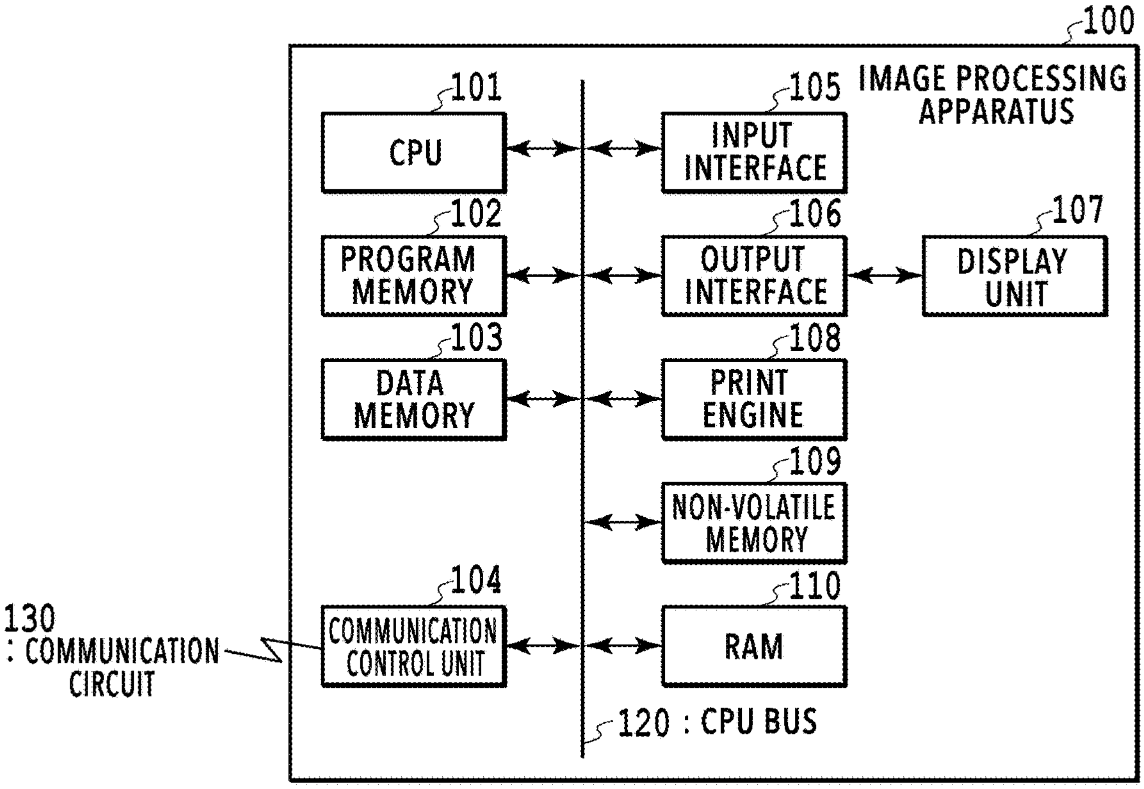
FIGS. 2A and 2B are block diagrams of an electronic apparatus and an external apparatus.

FIG. 2 is a diagram illustrating a configuration of the image processing apparatus 100 in the present embodiment. The image processing apparatus 100 has a central processing unit (CPU) 101, a program memory 102, a data memory 103, a communication control unit 104, an input interface 105, an output interface 106, a display unit 107, a print engine 108, a non-volatile memory 109, and a random access memory (RAM) 110. The CPU 101 is a system control unit and comprehensively controls the image processing apparatus 100. The program memory 102 stores control programs and a built-in operating system program to be executed by the CPU 101 and the like.

The data memory 103 stores program control variables and the like and is provided with various work buffer areas to be used in processing by the print engine 108. The communication control unit 104 controls data communication with an external entity through a communication line 130. The input interface 105 is an interface that accepts data inputs and operation instructions from the user and includes a physical keyboard and buttons, and the like. In the present embodiment, the image processing apparatus 100 includes no touch panel (that is, the input interface 105 includes no touch panel). Incidentally, the configuration is not limited to one with no touch panel and may be such that the output interface 106 to be described below and the input interface 105 are configured as an integrated element, and this single element outputs screens and accepts user operations. The output interface 106 is an interface that performs control for the display unit 107 to display data and notify of the status of the image processing apparatus 100.

The display unit 107 includes light emitting diodes (LEDs), a liquid crystal display (LCD), and the like, and displays data and notifies of the status of the image processing apparatus 100. The user performs operations by operating keys such as an enter key, up-down keys, a cancel key, and a power key, which are hardware keys, while viewing contents displayed on the display unit 107.

The print engine 108 forms an image on a print medium, such as paper, by using a printing material, such as an ink, based on information saved in the data memory 103 and a received print job, and outputs the print result. The non-volatile memory 109 is a device such as an electrically erasable programmable read-only memory (EEPROM) or a flash memory. The non-volatile memory 109 is mainly used to save data that needs to be retained even while power is not supplied to the image processing apparatus 100, such as setting values of the image processing apparatus 100.

The RAM 110 is a dynamic random access memory (DRAM) or the like that requires a backup power supply. The RAM 110 is also used as a main memory and a work area for the CPU 101 and functions as a reception buffer to temporarily save received print information. Moreover, the RAM 110 saves various information. The above constituent elements 101 to 106 and 108 to 110 are connected to one another through a CPU bus 120 managed by the CPU 101.

The image processing apparatus 100 is capable of communicating with the servers and a mobile terminal 200 illustrated in FIG. 1 through the communication network 300. The image processing apparatus 100 communicates with the servers to obtain permission statements, permission versions associated with the permission statements, and the like and holds them in the non-volatile memory 109.

Figure 2B:
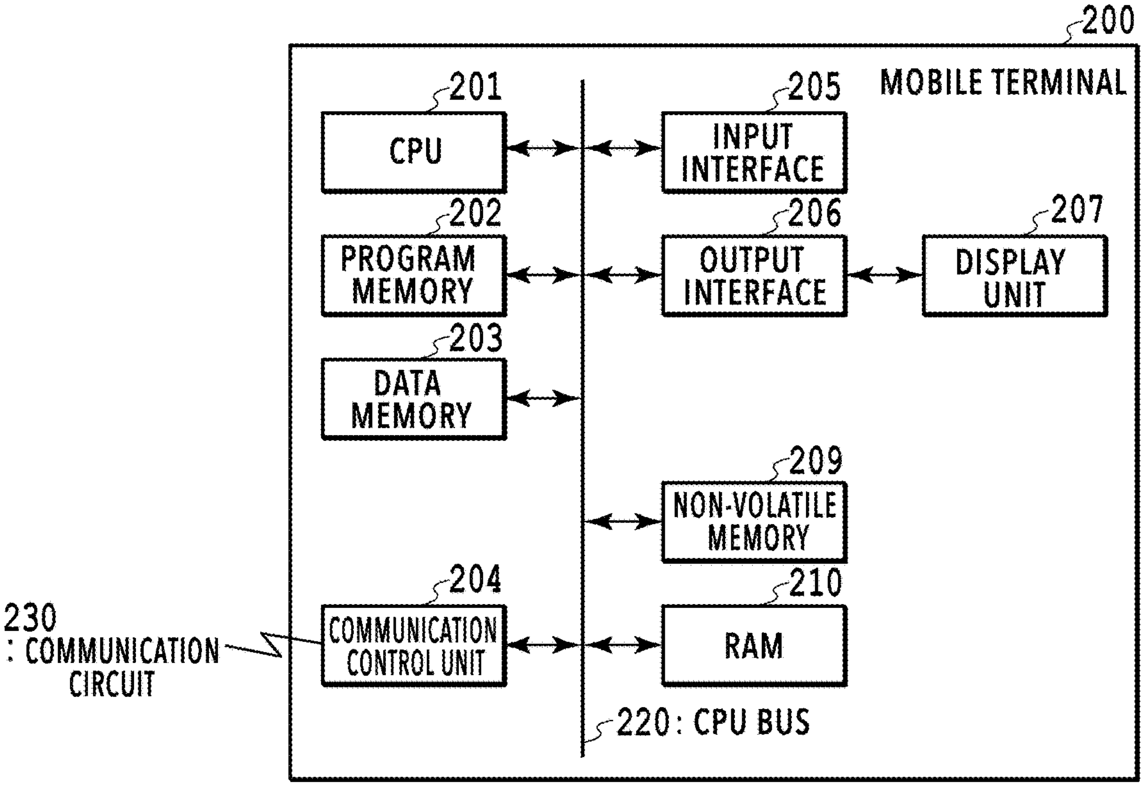

FIG. 2B is a diagram illustrating a configuration of the mobile terminal 200 in the present embodiment. The mobile terminal 200 is an information processing apparatus, e.g., a smartphone. The mobile terminal 200 has a CPU 201, a program memory 202, a data memory 203, a communication control unit 204, an input interface 205, an output interface 206, a display unit 207, a non-volatile memory 209, and a RAM 210.

The CPU 201 is a system control unit and comprehensively controls the mobile terminal 200. The program memory 202 stores control programs and a built-in operating system program to be executed by the CPU 201 and the like. The data memory 203 stores program control variable and the like and is provided with various work buffer areas. The communication control unit 204 controls data communication with an external entity through a communication line 230.

The input interface 205 is an interface that accepts data inputs and operation instructions from the user and includes a physical keyboard and buttons, a touch panel, and the like. Incidentally, the configuration may be such that the output interface 206 to be described below and the input interface 205 are configured as an integrated element, and this single element outputs screens and accepts user operations. The output interface 206 is an interface that performs control for the display unit 207 to display data and notify of the status of the mobile terminal 200.

The display unit 207 includes LEDs, an LCD, and the like, and displays data and notifies of the status of the mobile terminal 200. Incidentally, a software keyboard including keys such as number input keys, mode setting keys, an enter key, a cancel key, and a power key may be installed in the display unit 207 to accept user inputs via the display unit 207.

The non-volatile memory 209 is a device such as an EEPROM or a flash memory. The non-volatile memory 209 is mainly used to save data that needs to be retained even while power is not supplied to the mobile terminal 200, such as setting values of the mobile terminal 200.

The RAM 210 is a DRAM or the like that requires a backup power supply. The RAM 210 is also used as a main memory and a work area for the CPU 201 and functions as a transmission buffer to temporarily save information to be transmitted to the mobile terminal 200. Moreover, the RAM 210 saves various information. The above constituent elements are connected to one another through a CPU bus 220 managed by the CPU 201.

The mobile terminal 200 is capable of communicating with the servers and the image processing apparatus 100 illustrated in FIG. 1 through the communication network 300. The mobile terminal 200 communicates with the servers to obtain permission statements, permission versions associated with the permission statements, and the like and holds them in the non-volatile memory 209.

Figure 3A:
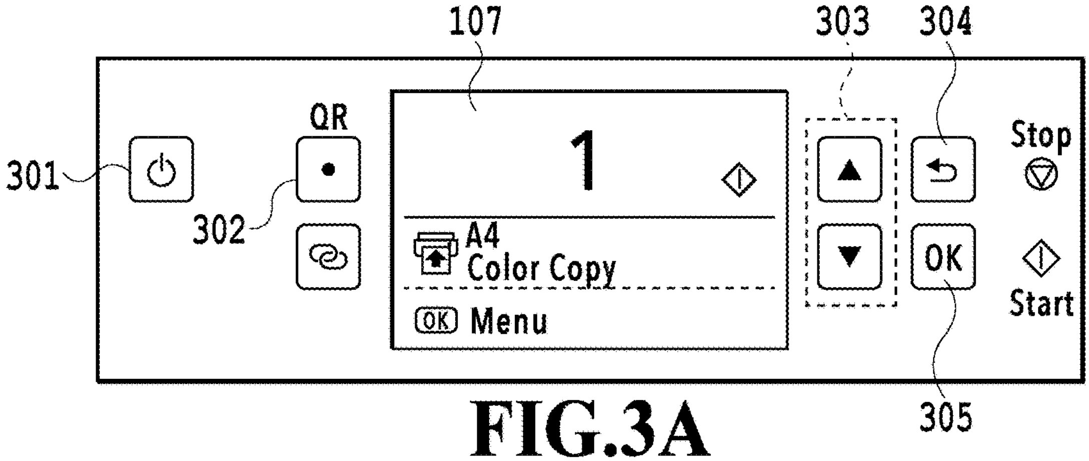
FIGS. 3A to 3D are an example of screens to be displayed on the electronic apparatus.
Figure 3B:
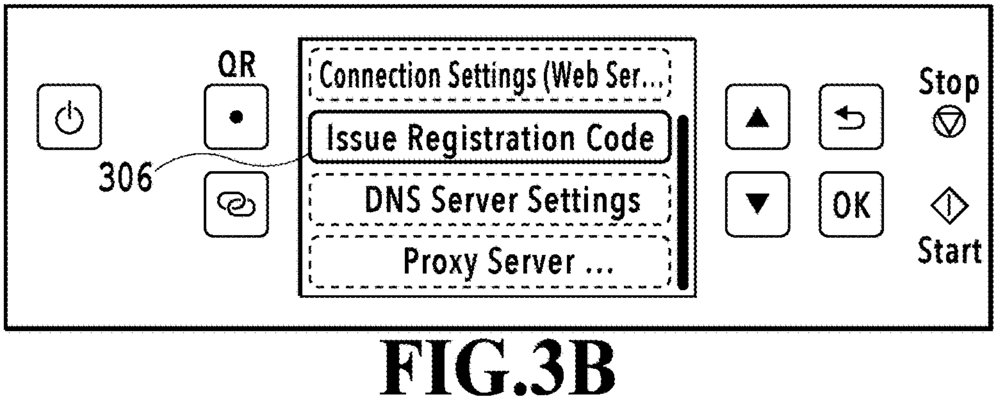
Figure 3C:
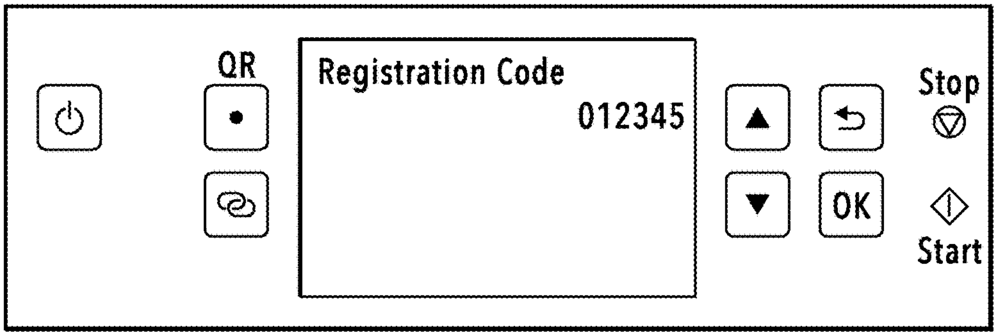

FIGS. 3A to 3D are an example of screens to be presented on the display unit 107 of the image processing apparatus 100. FIG. 3A is a display example of an initial screen (home screen) to be displayed first after activating the image processing apparatus 100. Note that the display unit 107 cannot accept touch operations, and therefore operations on the displayed screen are performed using the hardware keys disposed around the display unit 107 in FIG. 3A. A button 301 is a power key, which the image processing apparatus 100 is powered on and off. Buttons 303 are up-down keys and are buttons for selecting options from among various functions. A button 304 is a back key and is, for example, a button to be pressed to return the display to a previous screen. A button 305 is an OK key and is, for example, a button to be pressed to execute a function selected with the buttons 303. FIG. 3B is a display example of a screen with selectable service functions in the menu in FIG. 3A. In a case where consent has been granted to the service permission for the image processing apparatus 100, the image processing apparatus 100 can be registered for the cloud services, and therefore operations such as issuing a registration code necessary for registering for the services can be performed. Hence, the screen illustrated in FIG. 3C is displayed. In a case where consent has not been granted to the service permission for the image processing apparatus 100, then, selecting the issuing of a registration code in FIG. 3B will display the screen illustrated in FIG. 3D on the assumption that no consent has been granted to the permission to use the services.

Figure 3D:
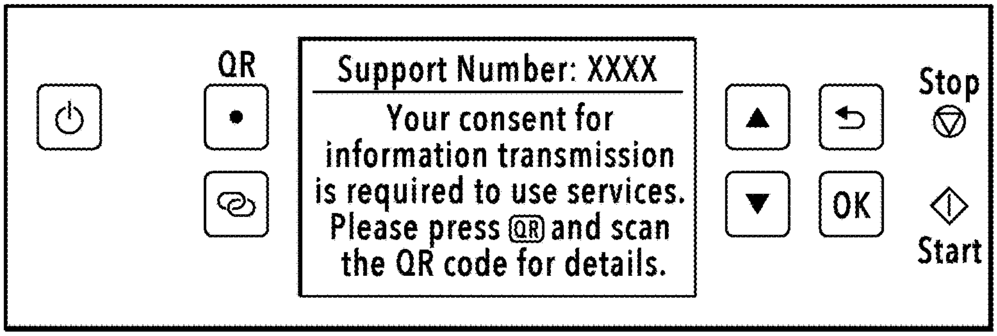
Figure 4:
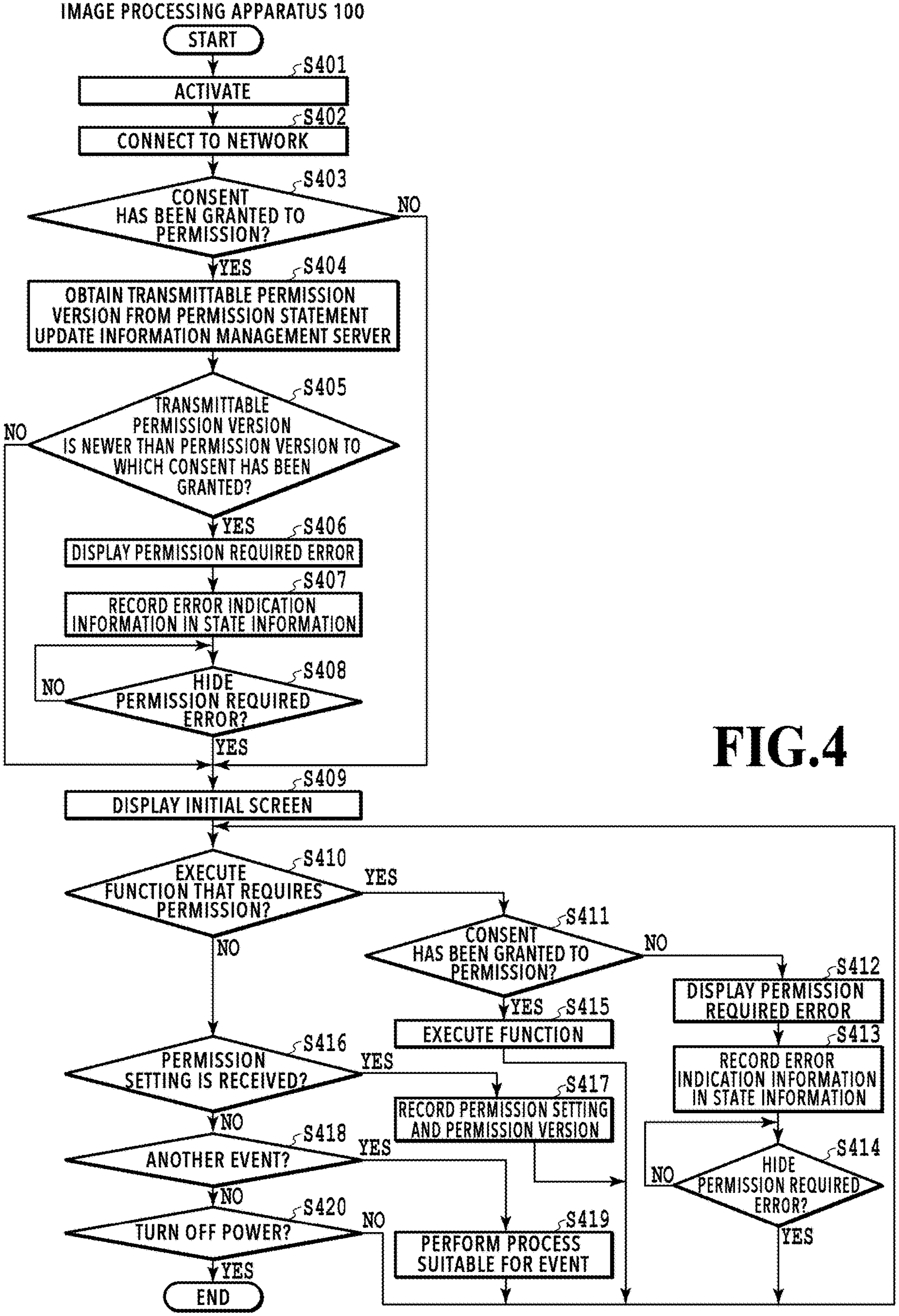
FIG. 4 is a flowchart of processing in the electronic apparatus.

FIG. 4 is a flowchart of processing in the image processing apparatus 100 in the present embodiment. A flow of processing including notification of an error due to a permission being required (hereinafter "permission requirement error") will be described from activation of the image processing apparatus 100. This processing is implemented by the CPU 101 loading a program recorded in the program memory 102 to the RAM 110 and executing it. Note that the sign "S" in the description of each process below means a step in the flowchart, and this applies also to the subsequent part of embodiment. In this flowchart, the processing starts in response to the power key 301 illustrated in FIG. 3 being pressed while the image processing apparatus 100 is powered off.

In S401, the CPU 101 activates the image processing apparatus 100. In S402, the CPU 101 connects to a network via the communication control unit 104. In S403, based on information read out of the non-volatile memory 109 which indicates the consent status of the content of a permission for information transmission from the mobile terminal 200 (consent information), the CPU 101 determines whether consent has been granted to the permission content. The CPU 101 proceeds to S404 if determining that consent has been granted, and it proceeds to S409 if determining that consent has not been granted. Note that, in the consent information, information corresponding to one of three values of "consented," "not consented," and "not yet consented" is recorded for the permission content. The value "consented" represents a situation where an operation indicating consent has been accepted from the user (the value has been accepted on an external apparatus). The value "not consented" represents a situation where an operation indicating a refusal to grant consent has been accepted from the user (the value has been accepted on the external apparatus). The value "not yet consented" represents a situation where neither an operation indicating consent nor an operation indicating a refusal to grant consent has been accepted from the user. If "consented" is recorded among these, the CPU 101 determines YES. If "not consented" or "not yet consented" is recorded, the CPU 101 determines NO.

In S404, the CPU 101 obtains the transmittable permission version from the permission statement update information management server 3. In S405, the CPU 101 determines whether the obtained transmittable permission version is newer than the permission version to which the consent has been granted. The CPU 101 proceeds to S406 if determining that the obtained transmittable permission version is newer, and it proceeds to S409 if determining that the obtained transmittable permission version is older.

In S406, determining that the permission needs to be updated, the CPU 101 performs control so as to display the notification of a permission requirement error illustrated in FIG. 3D. In doing so, the CPU 101 may guide the user to a web manual page describing how to configure a permission setting which is illustrated in FIG. 7B to be mentioned later by displaying a guide such as a uniform resource locator (URL) or a two-dimensional code. The notification of a permission requirement error indicates that the user's consent to information transmission is required to use the web services. That is, the notification indicates that consent to the permission content is required. Note that the image processing apparatus 100 itself does not accept an operation indicating consent to the permission content. Moreover, "Please press [QR] and scan the QR code (registered trademark) for details." is displayed. This is a display that prompts the user to scan a QR code (two-dimensional code) displayed on the display unit 107 with the mobile terminal 200 and perform an action or actions on the mobile terminal 200.

In S407, the CPU 101 records information indicating that the occurrence of the permission requirement error has been notified in the RAM 110. This information is recorded as part of the state information obtained by the mobile terminal 200 in S507 in FIG. 5 to be described later. In S408, the CPU 101 hides the displayed permission requirement error in response to the user selecting "OK." The CPU 101 proceeds to S409 once the permission requirement error is hidden.

In S409, the CPU 101 displays the initial screen illustrated in FIG. 3A.

In S410, the CPU 101 determines whether an operation indicating execution of a function that requires the permission for information transmission (requires consent to the permission content) (i.e., a function that uses the web services) has been performed. The CPU 101 proceeds to S411 if determining that an operation indicating execution of a function that requires the permission has been performed. Otherwise, the CPU 101 proceeds to S416. For example, in a case where a menu item 306, or "ISSUE REGISTRATION CODE," in the menu screen illustrated in FIG. 3B is selected, the CPU 101 determines that an instruction to execute a function that requires the permission has been issued.

In S411, based on the consent information on the permission read out of the non-volatile memory 109, the CPU 101 determines whether that a state indicating that consent to the permission content has been granted ("consented") is recorded. If determining that "consented" is recorded, the CPU 101 proceeds to S415. Otherwise ("not consented" or "not yet consented"), the CPU 101 proceeds to S412. Incidentally, the processing may be performed such that the CPU 101 proceeds to S412 only in the case where "not yet consented" is recorded and, in the case where "not consented" is recorded, does not proceed to S412 to respond to the operation indicating execution of the function that requires the permission.

In S412, as in S406, the CPU 101 displays the permission requirement error illustrated in FIG. 4D since an operation that represents consent to the permission content is required before executing the function for which an execution instruction was issued.

In S413, as in S407, the CPU 101 records information indicating that the occurrence of the permission requirement error has been notified in the RAM 110. Note that this step may be omitted in a case where information indicating that an error indication has been presented (hereinafter "error indication information") has already been recorded in S407. S414 is a similar process to S408, and description thereof is therefore omitted.

In S415, the CPU 101 executes the function for which an execution instruction was issued in S410 (the function that requires the permission). For example, the CPU 101 performs a process of downloading and printing an image saved on a cloud.

In S416, the CPU 101 determines whether the permission setting is received from the mobile terminal 200. The CPU 101 proceeds to S417 if determining that the permission setting is received. Otherwise, the CPU 101 proceeds to S418. In S416, the CPU 101 determines that the permission setting (information indicating the consent status, consent information) is received from the mobile terminal 200, for example, in a case where the mobile terminal 200 transmits consent information in the process of S806 or S811 in FIG. 8 to be described later and the image processing apparatus 100 receives it.

In S417, the CPU 101 overwrites and saves the permission information recorded in the non-volatile memory 109 according to the content of the permission setting indicating the consent statuses of the service permission and the analysis permission received from the mobile terminal 200 (consent information). In this way, the consent status that is based on the operation representing consent to the permission content accepted on the mobile terminal 200 can be saved in the image processing apparatus 100.

In S418, the CPU 101 determines whether another event has occurred. The CPU 101 proceeds to S419 if determining that another event has occurred. Otherwise, the CPU 101 proceeds to S420. In S419, the CPU 101 executes a process suitable for the event determined to have occurred in S418. For example, in a case where the user issues an instruction to execute a function that can be executed without consent to the permission content for information transmission, such as printing or scanning, the CPU 101 performs the printing or scanning in accordance with the instruction.

In S420, the CPU 101 determines whether an event by which the power should be turned off has occurred. If an event by which the power should be turned off has occurred, such as the power key 301 being pressed or no operation being performed for a predetermined time, the CPU 101 terminates the processing of FIG. 4. Otherwise, the CPU 101 proceeds to S410 and repeats the processing.

Figure 5:
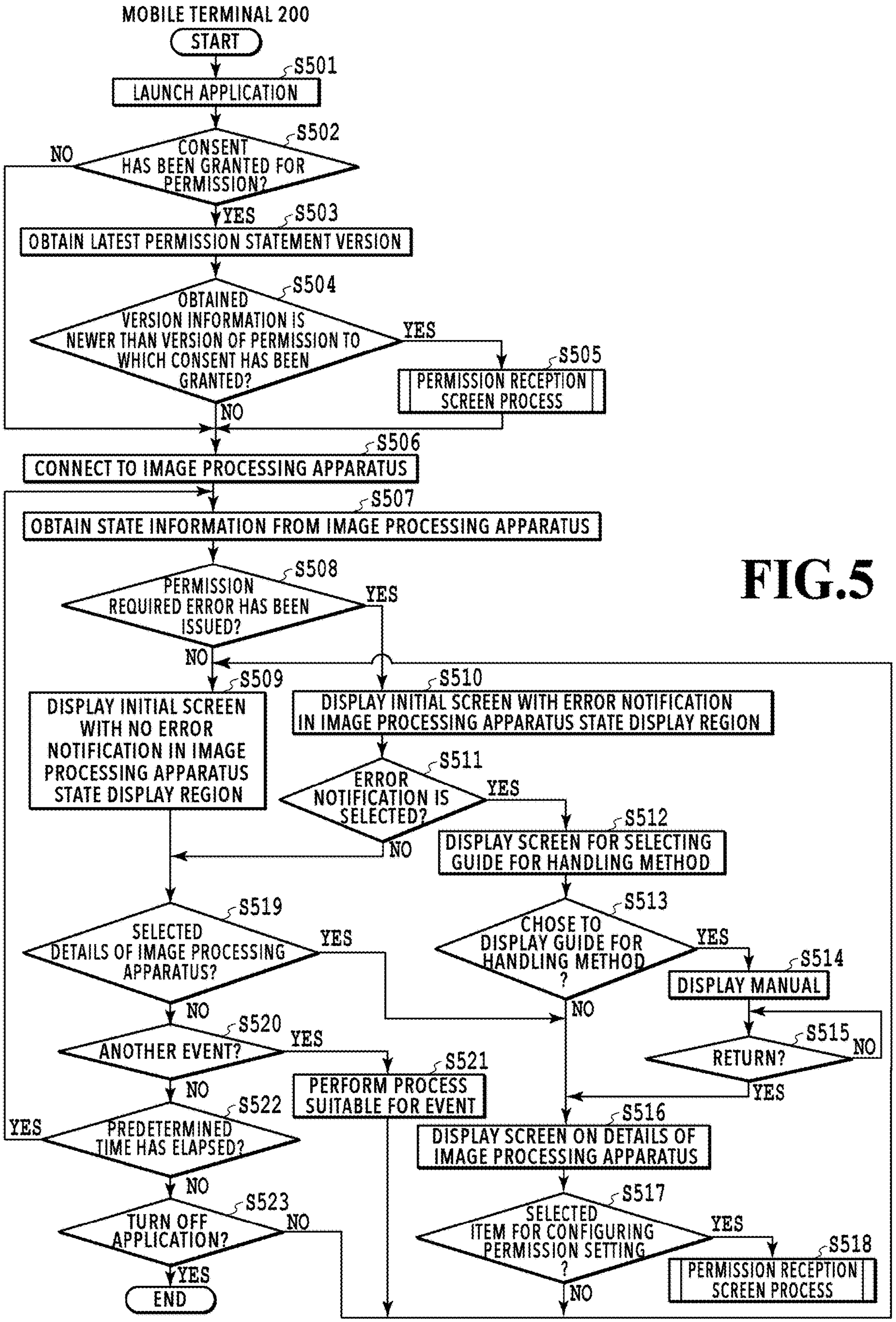
FIG. 5 is a flowchart of processing including providing guidance regarding permission in the external apparatus.

FIG. 5 is a flowchart of processing including providing guidance regarding permission in the mobile terminal 200 in the present embodiment. Each process in this flowchart is implemented by the CPU 201 loading a program stored in the program memory 202 (an application program for using the image processing apparatus 100, e.g., a printer link application) to the RAM 210 and executing it. The processing starts in a case where an operation of launching the predetermined application program for using the image processing apparatus 100 is performed on the mobile terminal 200.

In S501, the CPU 201 launches the predetermined application program. In S502, the CPU 201 reads out consent information (consent setting) indicating the consent statuses of the service permission and the analysis permission recorded in the non-volatile memory 209. If consent has been granted to either permission, the CPU 101 proceeds to S503. Otherwise, the CPU 201 proceeds to S506. In this consent information too, like the consent information in the image processing apparatus 100 described above, one of three values of "consented," "not consented," and "not yet consented" is given for each permission content.

In S503, the CPU 201 obtains the latest permission statement version from the permission statement information management server 2 via the communication control unit 204. The information to be obtained at this time may be the transmittable permission version that is obtained from the permission statement update information management server 3. In S504, the CPU 201 compares the version information obtained in S503 with the permission version of the permission content to which consent has been granted (the target permission content recorded as "consented") in the consent information recorded in the non-volatile memory 209. If determining that the version information obtained in S503 is newer than the permission version of the permission content to which consent has been granted, the CPU 201 proceeds to S505. Otherwise, the CPU 201 proceeds to S506.

In S505, the CPU 201 performs a permission acceptance screen process. The permission acceptance screen process will be described later using FIG. 8.

In S506, the CPU 201 connects to the image processing apparatus 100 by wireless communication or wired communication via the communication control unit 204. In S507, the CPU 201 receives and obtains state information transmitted from the connected image processing apparatus 100.

In S508, the CPU 201 determines whether the obtained state information of the image processing apparatus 100 contains information indicating that the occurrence of a permission requirement error has been notified. The CPU 201 proceeds to S510 if information indicating that the occurrence of a permission requirement error has been notified is contained, and it proceeds to S509 if not contained. In a case where error indication information has been recorded in the state information in the process of S407 or S413 by the image processing apparatus 100 described earlier, state information containing the error indication information is obtained in S507. In the case where error indication information is contained in the state information obtained in S507, it is determined in S508 that a permission requirement error has occurred. In sum, the determination in S508 determines whether the information received from the image processing apparatus 100 contains information indicating that a display indicating a need for consent to the permission content for information transmission (the display in FIG. 3D) has been presented on the image processing apparatus 100.

Figure 6A:
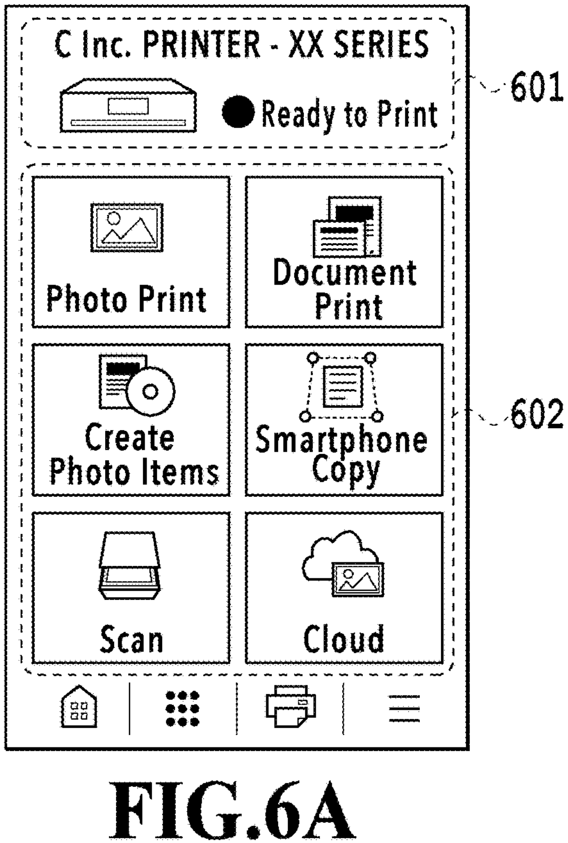
FIGS. 6A to 6D are an example of screens to be displayed on the external apparatus.

FIGS. 6A to 6D are a display example of screens by a printer link application displayed on the display unit of the mobile terminal 200. In S509, the CPU 201 displays an initial screen with no error notification in a state display region 601 as illustrated in FIG. 6A. The state display region 601 at the top of the screen is a state display region to display the state (status) of the image processing apparatus 100. In FIG. 6A, a function list region 602 disposed at a lower portion is a region displaying multiple function items corresponding to multiple functions that can be executed with the image processing apparatus 100 from the mobile terminal 200. The user can select any of the function items to issue an instruction to execute the selected function. FIG. 6A is a display example of the initial screen by the printer link application in a case where the state information obtained in S507 does not contain error indication information. The state display region 601 in FIG. 6A indicates that the image processing apparatus 100 is ready to perform printing and displays no error notification.

Figure 6B:
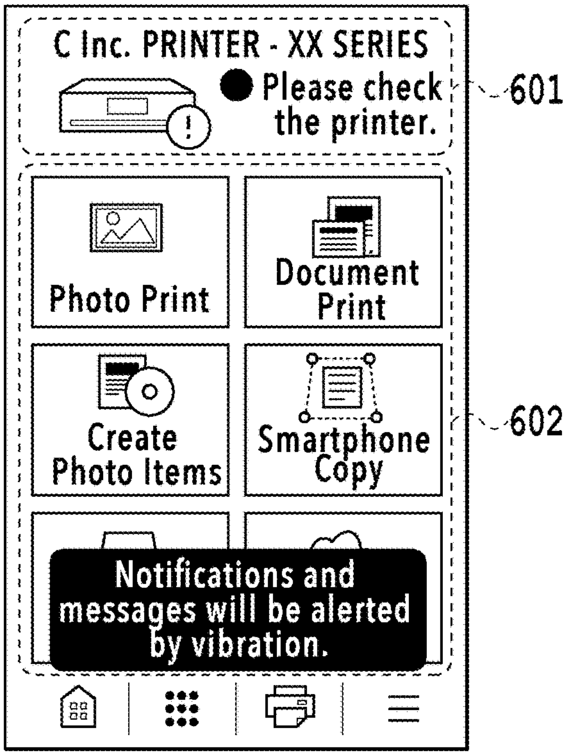

In S510, the CPU 201 displays the initial screen with an error notification in the state display region 601 as illustrated in FIG. 6B. FIG. 6B is a display example of the initial screen by the printer link application in a case where the state information obtained in S507 contains error indication information. The state display region 601 in FIG. 6B displays information indicating that an error has occurred on the image processing apparatus 100 (an error icon and an error message) as an error notification. Note that the displayed state will also be FIG. 6B in a case where the state information obtained in S507 contains information indicating another type of error different from the error indication information recorded in S407 or S413. Description of the cause of the other type of error will be omitted, and the following description will assume that the cause of the error notification is the fact that the error indication information recorded in S407 or S413 has been obtained.

In S511, the CPU 201 determines whether an operation of selecting the state display region 601 with the error notification has been performed. If it is determined that an operation of touching the state display region 601 displaying the error notification to select it has been performed, the CPU 201 proceeds to S512. Otherwise, the CPU 201 proceeds to S519.

Figure 6C:
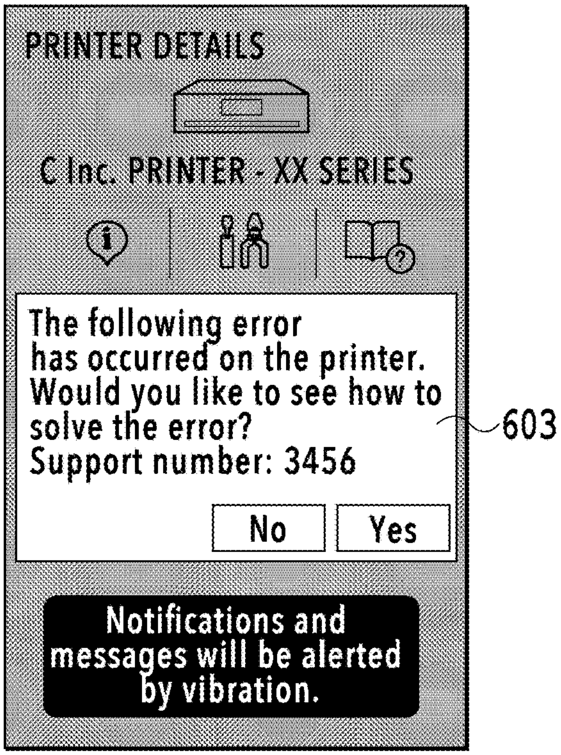

In S512, the CPU 201 displays a screen for selecting whether to display guidance for a handling method as illustrated in FIG. 6C. In the selection screen, a message indicating that an error has occurred on the printer and asking whether to display a method to handle the error, and options "YES" and "NO" are displayed in a dialog 603.

In S513, the CPU 201 determines whether the user has touched the "YES" button displayed in the dialog 603 (whether the user has performed an operation indicating display of a guide for a handling method). If determining that the "YES" button is touched, the CPU 201 proceeds to S514. Otherwise ("NO" is selected), the CPU 201 proceeds to S516.

Figure 7A:
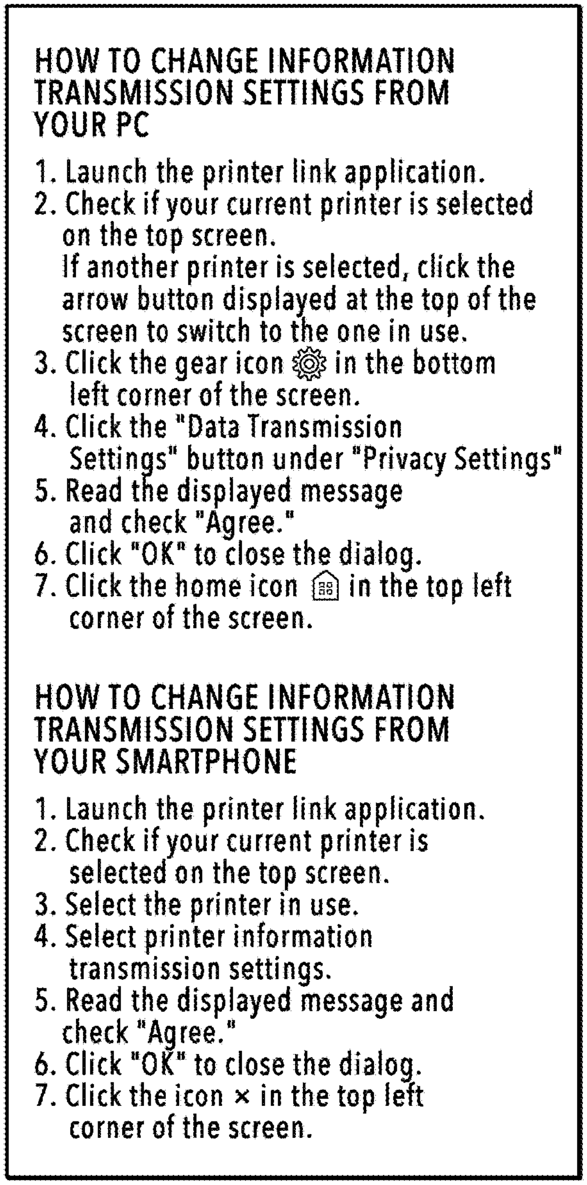
FIGS. 7A and 7B are an example of screens to be displayed on the external apparatus.
Figure 7B:
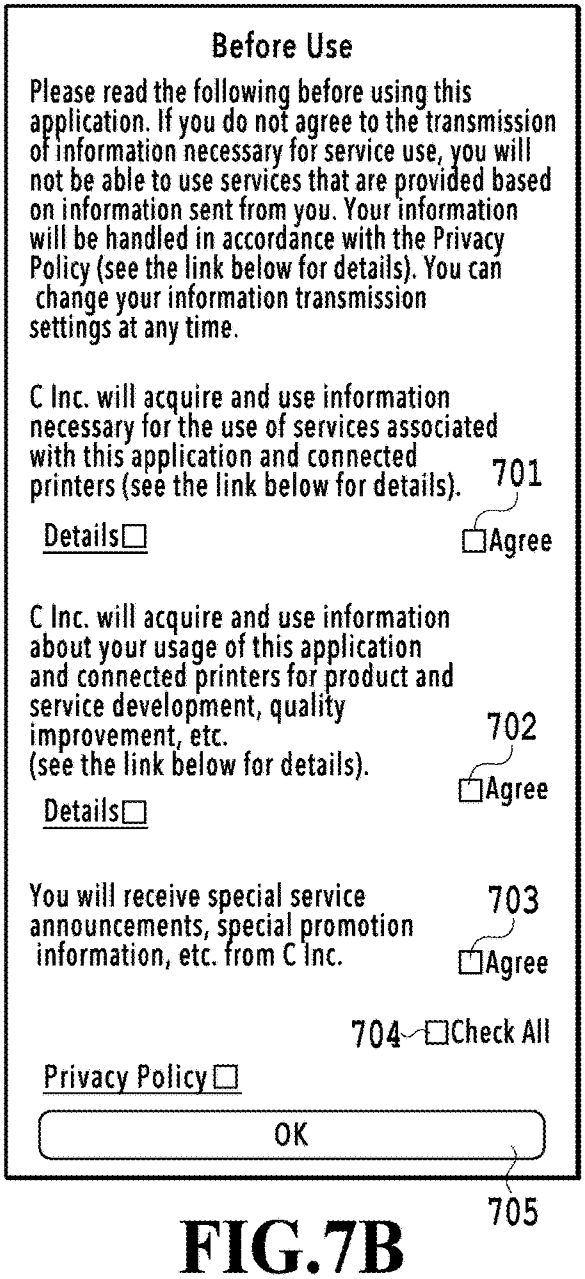

FIGS. 7A and 7B are diagrams illustrating an example of a manual display screen and a permission consent screen to be displayed in an application screen of the mobile terminal 200. In S514, the CPU 201 displays a permission setting manual (guide) as illustrated in FIG. 7A as a guide for a handling method. This screen displays a guide as an operation procedure to display a permission acceptance screen for accepting operations of granting consent to the permission contents illustrated in FIG. 7B on the printer link application, which is a personal computer (PC) application or a smartphone application. This guide corresponds to items 1 to 4 under "HOW TO CHANGE SETTINGS FOR INFORMATION TRANSMISSION FROM YOUR PC" and items 1 to 4 under "HOW TO CHANGE SETTINGS FOR INFORMATION TRANSMISSION FROM YOUR SMARTPHONE" in FIG. 7A. The screen also displays a guide as an operation procedure to perform an operation equivalent to granting consent to the content of any permission in the permission acceptance screen. This guide corresponds to an item 5 under "HOW TO CHANGE INFORMATION TRANSMISSION SETTINGS FROM YOUR PC" and an item 5 under "HOW TO CHANGE INFORMATION TRANSMISSION SETTINGS FROM YOUR SMARTPHONE" in FIG. 7A. By seeing these guides, the user can easily recognize how to operate the printer link application to perform an operation of granting consent to the permission content for information transmission as a way to handle the error displayed on the image processing apparatus 100. Incidentally, in addition to the contents illustrated in FIG. 7A, a display item for accepting an instruction to directly transition to the permission acceptance screen illustrated in FIG. 7B may be displayed. In a case where this display item is touched, the screen will transition to the permission acceptance screen without going through other screens, and the later-described permission acceptance screen process will be performed. Specifically, an operation of granting the user's consent is accepted. Also, instead of displaying FIG. 7A, the permission acceptance screen in FIG. 7B may be displayed in response to determining YES in S513, and the later-described permission acceptance screen process may be performed.

In S515, the CPU 201 determines whether the user has performed an operation of returning from the state where the guide in FIG. 7A is displayed (or a cancel operation). If determining that the returning operation has been performed, the CPU 201 proceeds to S516. Otherwise, the CPU 201 waits for the returning operation.

Figure 6D:
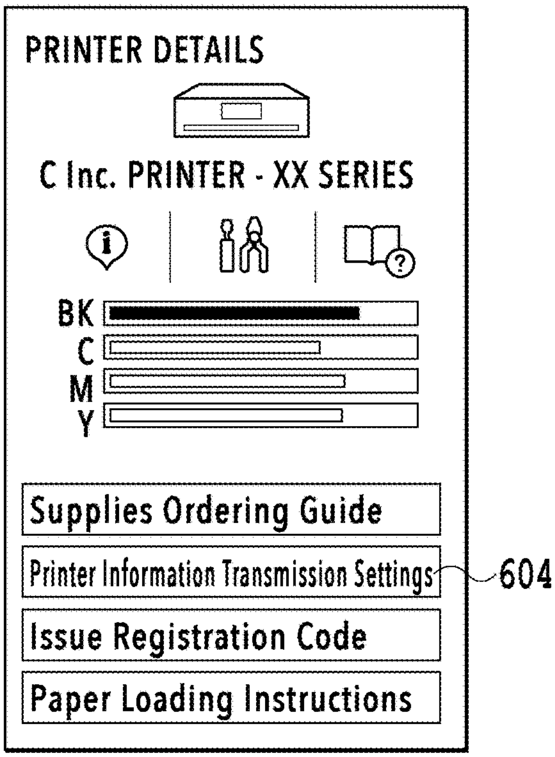

In S516, the CPU 201 displays a printer detail screen indicating details of the image processing apparatus 100 as illustrated in FIG. 6D. The printer detail screen an item 604 "PRINTER INFORMATION TRANSMISSION SETTINGS." In S517, the CPU 201 determines whether an operation of selecting the item 604 has been performed. If determining that an operation of touching the item 604 to select it has been performed, the CPU 201 proceeds to S518. Otherwise, the CPU 201 proceeds to S509 in response to a returning operation after executing a process or processes corresponding to other operations on the printer detail screen. This time, since the user has already selected the error notification once in S511 and checked information on the error, the CPU 201 disables the error notification in the state display region 601 and displays the state with no error notification.

In S518, the CPU 201 performs a permission acceptance screen process. The permission acceptance screen process will be described later using FIG. 8.

In S519, the CPU 201 determines whether a touch operation has been performed on the state display region 601. If determining that the state display region 601 has been touched, the CPU 201 proceeds to S516. Otherwise, the CPU 201 proceeds to S520.

In S520, the CPU 201 determines whether another operational event has occurred. The CPU 201 proceeds to S521 if it is determined that another operational event has occurred. Otherwise, the CPU 201 proceeds to S522. In S521, the CPU 201 executes a process suitable for the event. For example, the CPU 201 performs a process of transmitting a print job to the image processing apparatus 100 and causing it to perform printing.

In S522, the CPU 201 determines whether a predetermined time has elapsed since the process of S507 was performed last. If determining that the predetermined time has elapsed, the CPU 201 proceeds to S507 and obtains the state information from the image processing apparatus 100 again. In other words, the printer link application regularly obtains the state information from the image processing apparatus 100 and determines whether to make an error notification. If determining in S522 that the predetermined time has not elapsed, the CPU 201 proceeds to S523.

In S523, the CPU 201 determines whether an event by which the printer link application should be turned off (closed or terminated) has occurred. If determining that an event by which the application should be turned off has not occurred, the CPU 201 returns to S509 and repeats the processing. If an event by which the application should be turned off has occurred, the CPU 201 terminates the processing of FIG. 5.

Figure 8:
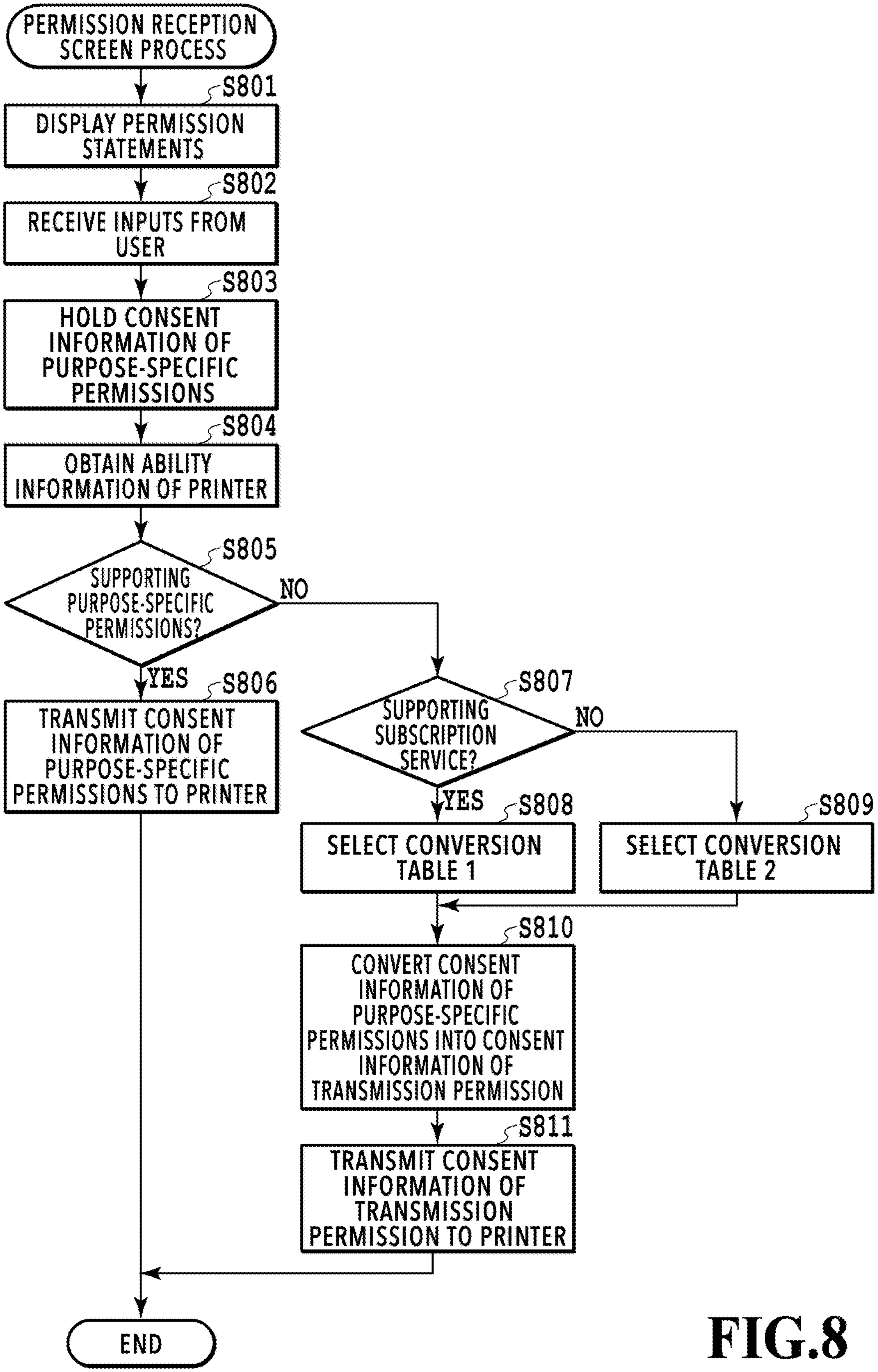
FIG. 8 is a flowchart of processing for configuring a permission setting in the external apparatus.

FIG. 8 is a flowchart of the permission acceptance screen process by the mobile terminal 200 in the present embodiment. Specifically, FIG. 8 is a flowchart illustrating details of the permission acceptance screen process in S505 or S518 in FIG. 5. A flow of processing until transmitting consent information indicating the user's consent to the permission or refusal to grant consent to the permission held in the mobile terminal 200 to the image processing apparatus 100 will be described.

In S801, upon transitioning to a permission consent screen requesting consent to the permission in response to a user operation or the like on the mobile terminal 200, the CPU 201 displays the screen on the display unit 207.

FIG. 7B is an example of the permission consent screen. The permission consent screen displays the permission statements to the user. In the present embodiment, there are three permission statements for "service permission" and "analysis permission" mentioned earlier and additionally "permission to provide guide information." For each permission statement, a checkbox to indicate consent to it is provided. Here, "permission to provide guide information" is a permission to regularly provide guide information to the mobile terminal 200 for the user and is a permission that is not needed by the image processing apparatus 100.

A checkbox 701 at the top is an operation item for accepting an operation of granting consent to the permission statement of the service permission. Performing an operation of checking the checkbox 701 and touching an OK button 705 will grant consent to the service permission. A checkbox 702 in the middle is an operation item for accepting an operation of granting consent to the permission statement of the analysis permission. Performing an operation of checking the checkbox 702 and touching the OK button 705 will grant consent to the analysis permission. A checkbox 703 at the bottom is an operation item for accepting an operation of granting consent to the permission statement of the permission to provide guide information. The permission to provide guide information is a permission to send push notifications to the mobile terminal 200 (smartphone) in which the application has been installed. The permission is therefore not relevant to the printer itself (image processing apparatus 100), and whether the checkbox 703 is checked or not does not affect the printer. Check all 704 is an operation item for accepting an instruction to check all of the three checkboxes described above.

In S802, the CPU 201 accepts inputs on consent from the user on the permission consent screen illustrated in FIG. 7B. Here, "service permission" and "analysis permission" are consent information necessary for the image processing apparatus 100, and therefore information about whether operations regarding consent to those have been accepted is transmitted to the image processing apparatus 100 in the process flow to be described later. On the other hand, "permission to provide guide information" is a permission to regularly provide guide information to the user, and it is not necessary for the image processing apparatus 100. Hence, no information will be transmitted to the image processing apparatus 100 about whether an operation regarding consent to it has been accepted.

In S803, in response to the user selecting "OK" in FIG. 7B, the CPU 201 holds (records) the consent information on each of purpose-specific permissions in the non-volatile memory 209. FIG. 9A illustrates a representation of how the information indicating the consent statuses of the purpose-specific permissions are held in the mobile terminal 200 by the process in S803. The example of FIG. 9A is an example in which "consented" is recorded for "service permission," "not consented" is recorded for "analysis permission," and "2" is recorded as the version of the permissions for which the consent operations were accepted. As described above, the consent statuses of the purpose-specific permissions include the statuses of consent to the statements of the multiple types of permissions "service permission" and "analysis permission."

In S804, the CPU 201 obtains ability information of the image processing apparatus 100 via communication with the image processing apparatus 100 using the communication control unit 204. The ability information refers to information for communicating functions (abilities) of the image processing apparatus 100 to external terminals that communicate with the image processing apparatus 100. The ability information in the present embodiment includes whether the purpose-specific permissions are supported or not and whether a subscription service is supported or not.

In a case where the purpose-specific permissions are supported, it indicates that the image processing apparatus 100 has an ability to record the consent statuses of the contents of multiple types of permissions including two permissions which are the service permission and the analysis permission. In a case where the purpose-specific permissions are not supported, it indicates that the image processing apparatus 100 does not have the ability to record the consent statuses of multiple types of permission contents and is only able to record the consent status of one type of permission content. That is, in the case where the purpose-specific permissions are not supported, the image processing apparatus 100 will not be able to record the consent statuses of the two types of permissions being the service permission and the analysis permission. Note that the purpose-specific permissions are assumed to be not supported in a case where information indicating that the purpose-specific permissions are not supported is not obtained from the ability information or information indicating that the purpose-specific permissions are not supported is obtained from the ability information.

Also, in a case where the subscription service is supported, it indicates that the image processing apparatus 100 has an ability to use the subscription service, which will be described later. Whether the image processing apparatus 100 has actually subscribed to and is using the subscription service is not taken into consideration. That is, even in the case where the subscription service is supported, it is impossible to determine from this information whether the image processing apparatus 100 has actually subscribed to and is using the subscription service or has not subscribed to and therefore is not using the subscription service. Also, in a case where the subscription service is not supported, it indicates that the image processing apparatus 100 does not have the ability to use the subscription service, which will be described later. In the case where the subscription service is not supported, it is apparent that the user neither has subscribed to nor is using a subscription service using this printer (image processing apparatus 100). Note that the subscription service is assumed to be not supported in a case where information indicating that the subscription service is supported is not obtained from the ability information or information indicating that the subscription service is not supported is obtained from the ability information.

In S805, the CPU 201 determines whether the purpose-specific permission is supported based on the ability information obtained from the image processing apparatus 100. If the image processing apparatus 100 supports the purpose-specific permissions, the CPU 201 proceeds to S806. If the image processing apparatus 100 does not support the purpose-specific permissions, the CPU 201 proceeds to S807.

In S806, the CPU 201 communicates with the image processing apparatus 100 via the communication control unit 204 to transmit the consent information of the purpose-specific permissions held in S803 to the image processing apparatus 100. Since the image processing apparatus 100 supports the purpose-specific permissions, it can interpret the received purpose-specific permissions. The consent information on the purpose-specific permissions to be transmitted to the image processing apparatus 100 includes the consent information on the service permission and the analysis permission and their permission version. Note that the consent information on the permission to present guides to the user described in connection with S802 is not necessary for the image processing apparatus 100 but may be transmitted to the image processing apparatus 100. In S806, the CPU 201 transmits the consent status of the service permission (the information indicating "CONSENTED" in the example of FIG. 9A), the consent status of the analysis permission (the information indicating "NOT CONSENTED" in the example of FIG. 9A), and their permission version (the information indicating "2" in the example of FIG. 9A) to the image processing apparatus 100. In this case, the CPU 201 does not transmit information indicating the consent status of "transmission permission" as a type of permission. In other words, the CPU 201 transmits neither information indicating consent to the transmission permission nor information indicating a refusal to consent to the transmission permission. That is, the CPU 201 transmits a type of information different from the information to be transmitted in S811 to be described later. After finishing the process in S806, the CPU 201 terminates the processing of this flowchart.

If the image processing apparatus 100 does not support the purpose-specific permissions, the mobile terminal 200 performs a process of converting the consent statuses into the transmission permission. Specifically, the mobile terminal 200 performs a process of converting the consent statuses of the purpose-specific permissions as illustrated in FIG. 9A (i.e., the statuses of multiple types of permissions) into the transmission permission representing the consent status of a single type of permission as illustrated in FIG. 9B by processes in and after S807. Then, the mobile terminal 200 transmits the consent status of the transmission permission to the image processing apparatus 100. Note that the version information included in the consent statuses of the purpose-specific permissions is transmitted to the image processing apparatus 100 without being converted. The image processing apparatus 100 stores the consent status of the transmission permission received and the version information.

In S807, the CPU 201 determines whether the subscription service is supported in the ability information obtained from the image processing apparatus 100. The CPU 201 proceeds to S808 if the image processing apparatus 100 supports the subscription service, and it proceeds to S809 if the image processing apparatus 100 does not support the subscription service.

The subscription service refers to a service that allows printing up to a maximum number of pages each month for a fixed fee. The fixed monthly fee for using the subscription service covers the costs of printing agents (inks or toners) and the like. As long as printing remains within the maximum number of pages, there will be no additional charges for the printing agents. This means that, in a case where the printing agents (inks or toners) run low before reaching the maximum number of pages, the printing agents can be ordered at no extra cost. Using the subscription service inevitably requires transmitting the number of printed pages to the server that provides the subscription service. The transmission of information indicating the number of printed pages corresponds to the transmission of information that is transmitted in the case where consent is granted to the analysis permission. A user or a printer (image processing apparatus) that has subscribed to use the subscription service must have granted consent to permission equivalent to the analysis permission at the time of signing up for the subscription service. Specifically, the user must have granted consent to transmission of the number of printed pages as transmission of information required to use the subscription service. For this reason, in a case where the subscription service is already being used (or subscribed to), it is considered unnecessary to obtain consent to the analysis permission again. In fact, the user may accidentally perform an operation of refusing to grant consent to the analysis permission. This will lead to a situation where the user cannot use the subscription service which they have signed up for.

In S808, the CPU 201 selects a conversion table 1 illustrated in FIG. 9C for conversion from the purpose-specific permissions to the transmission permission. The conversion table 1 indicates that information indicating consent to the transmission permission (first information) will be transmitted to the image processing apparatus 100 in a case of accepting an operation indicating consent to the service permission regardless of whether consent has been granted to the analysis permission. Also, the conversion table 1 indicates that information indicating a refusal to consent to the transmission permission (second information) will be transmitted to the image processing apparatus 100 in a case of accepting an operation indicating a refusal to consent to the service permission regardless of whether consent has been granted to the analysis permission.

In S809, on the other hand, the CPU 201 selects a conversion table 2 illustrated in FIG. 9D for conversion from the purpose-specific permissions to the transmission permission. The conversion table 2 indicates that the information indicating consent to the transmission permission (first information) will be transmitted to the image processing apparatus 100 in a case of accepting an operation indicating consent to both the service permission and the analysis permission. The conversion table 2 also indicates that the information indicating a refusal to consent to the transmission permission (second information) will be transmitted to the image processing apparatus 100 in a case of accepting an operation indicating a refusal to consent to at least one of (i.e., both or one of) the service permission and the analysis permission.

In S810, the CPU 201 converts the consent information of the purpose-specific permissions into the consent information of the transmission permission by using the conversion table 1 or 2.

In S811, the CPU 201 communicates with the image processing apparatus 100 via the communication control unit 204 to transmit the consent information of the transmission permission obtained in S810 and the version information held in S803 to the image processing apparatus 100. The consent information of the purpose-specific permissions is converted into the consent information of the transmission permission based on whether the subscription service is supported or not for the following reason. First, for the conversion from the purpose-specific permissions into the transmission permission to be handled in a more rigorous manner, it is advantageous to grant consent to the transmission permission in a case where consent is obtained for all of the purpose-specific permissions. That is, it is usually advantageous to use the conversion table 2 illustrated in FIG. 9D. Here, in a case where the image processing apparatus 100 supports the subscription service but does not support the purpose-specific permissions, it is possible that the subscription service has been enabled on condition that consent is granted to the transmission permission. With the conversion table 2 illustrated in FIG. 9D, consent is not granted to the transmission permission in a case where the user has granted consent to the service permission on the mobile terminal 200 in order to use the subscription service but refused to grant consent to the analysis permission. This prevents the user from enabling the subscription service as they intended. For this reason, to avoid the disadvantage for the user, it will be necessary to use the conversion table 1 illustrated in FIG. 9C, that is, to determine the consent information of the transmission permission by using only the consent information of the service permission regardless of the consent status of the analysis permission. Specifically, in the case where the subscription service is supported, it is possible that the user or the printer has subscribed to the subscription service. Hence, as in the present embodiment, the conversion table 1 is used in a case of transmitting a consent status to an apparatus not supporting the purpose-specific permissions but supporting the subscription service. In this way, it is possible to avoid the above-described unfavorable situation while the user or the printer has subscribed to and is using the subscription service. Incidentally, in the present embodiment, an example has been described in which whether to use the conversion table 1 or to use the conversion table 2 is determined based on whether the subscription service is supported or not. However, the present embodiment is not limited to this example. In a case where information indicating whether the user or the printer has subscribed to and is using the subscription service (usage information) can be obtained, whether to use the conversion table 1 or to use the conversion table 2 may be determined based on that information. Specifically, the conversion table 1 may be used if it can be determined based on the usage information that the user or the printer has subscribed to and is using the subscription service, and the conversion table 2 may be used otherwise (e.g., if the apparatus supports the subscription service but has not subscribed to it).

Note that, in the present embodiment, the conversion table to be used is selected based on whether the subscription service is selected or not, but the criterion for selecting the conversion table is not limited to whether the subscription service is supported or not. In a case where consent to the service permission is included as a requirement for using the image processing apparatus 100, the consent can also be a condition for selecting the conversion table 1 other than the subscription service.

Also, instead of selecting the conversion table to be used based on a condition, the conversion may be done based always on one of the conversion tables. Specifically, the processing may proceed to S808 without performing the process in S807.

Alternatively, the processing may proceed to S809 without performing the process in S807.

Also, in the present embodiment, the ability information of the image processing apparatus 100 is obtained in S804 and then the consent statuses of the purpose-specific permissions (the consent statuses of multiple types of permissions) or the consent status of the transmission permission (a single consent status) is transmitted to the image processing apparatus 100. However, obtaining the ability information is not necessarily essential. For example, the obtaining of the ability information of the image processing apparatus 100 may be omitted, and both the consent statuses of the purpose-specific permissions and the consent status of the transmission permission converted from the purpose-specific permissions may be transmitted to the image processing apparatus 100. In sum, it is possible to employ an approach that leaves it up to the image processing apparatus 100 to determine how to reflect and set each piece of permission information transmitted.

As described above, the present embodiment improves user friendliness in a case where it is necessary to grant consent to the content of a permission on an electronic apparatus. Specifically, in a case where the image processing apparatus 100 (electronic apparatus) notifies that consent to the content of a permission is required (error indication), the mobile terminal 200 (an information processing apparatus as an external apparatus for the electronic apparatus) obtains state information indicating that the need for consent to the permission content has been displayed on the image processing apparatus 100. In response to obtaining the state information indicating that the need for consent to the permission content has been displayed on the image processing apparatus 100, the mobile terminal 200 performs a display process of suggesting an operation procedure for the user to perform an operation of granting consent to the permission content and a process of displaying the permission acceptance screen on the mobile terminal 200. In this way, it is easier for the user to recognize how to operate the mobile terminal 200, which is an external apparatus, to perform an operation that indicates consent after the need for consent to the permission content is displayed on the image processing apparatus 100.

Note that, in the present embodiment, the mobile terminal 200 determines whether to update the permission version and configures the permission setting before connecting to the image processing apparatus 100. This permission setting is a setting on a permission for information transmission to the service providing server group 1 from the mobile terminal 200, and it does not necessarily have to be transmitted to the image processing apparatus 100.

Note that, in the present embodiment, the mobile terminal 200 obtains the latest permission version only after the application is launched, but it may obtain it immediately before configuring the permission setting.

Note that, in the present embodiment, the mobile terminal 200 directly obtains the state information of the image processing apparatus 100, but the information may be communicated through an external server such as one in the service providing server group 1.

Note that each of the above various types of control described to be performed by the CPUs may be performed by a single piece of hardware, or the processing may be distributed and shared by multiple pieces of hardware (e.g., multiple processors or circuits) to control the whole apparatus.

Also, while the present disclosure has been described in detail based on its preferred embodiments, the present disclosure is not limited to these specific embodiments and encompasses various forms without departing from the gist of this disclosure. Further, each of the above embodiments is merely one embodiment of the present invention, and the embodiments can be combined as appropriate.

Also, the above embodiments have been described based on an example case where the present disclosure is applied to a mobile terminal and an image processing apparatus, but the present disclosure is not limited to this example. The electronic apparatus is not limited to the above image processing apparatus 100, and the present disclosure is applicable to any electronic apparatus that requires its user's consent to the content of a permission for information transmission from the electronic apparatus. For example, as such an electronic apparatus, an image output apparatus that transmits information on its user's viewing habit or the like to a server, such as a television set, may be employed. Moreover, the present disclosure is applicable to smart speakers (audio speakers), music players, game consoles, electronic book readers, smartwatches, home appliances, IoT terminals, mobility devices such as automobiles, and so on that transmit the contents of conversations with their users and the like to servers. Also, as the information processing apparatus, any apparatuses can be employed as long as they are capable of performing a process of obtaining information from the electronic apparatus and allowing the user to perform an operation of granting consent to the content of a permission for information transmission. For example, smartphones, tablet terminals, PCs, and the like can be employed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-006729, filed Jan. 19, 2024, which is hereby incorporated by reference wherein in its entirety.

What is claimed is:

1. An information processing system comprising an electronic apparatus and an information processing apparatus, wherein the electronic apparatus includes at least one memory and at least one processor which function as:

a display control unit that, in response to the electronic apparatus accepting an operation for using a web service, checks permission information indicating whether a user has granted consent to a permission content and, in a case where the user has not granted consent, performs control so as to display a specific screen indicating that a permission for information transmission from the electronic apparatus is required; and a recording unit that records specific information indicating that the display control unit has displayed the specific screen, and the information processing apparatus includes at least one memory and at least one processor which function as:

a reception unit that receives state information indicating a state of the electronic apparatus;

a control unit that, in a case where the state information contains the specific information, performs control so as to perform a predetermined process for allowing the user to perform an operation on the information processing apparatus, the operation indicating whether to grant consent to a content of the permission for information transmission from the electronic apparatus; and an acceptance unit that accepts the operation indicating whether to grant consent to the content of the permission, wherein the information processing apparatus presents an error indication associated with the electronic apparatus in a case where the state information contains the specific information, and performs the predetermined process in a case where the user performs an operation for the error indication, and wherein the electronic apparatus performs control so as to communicate with a server system and check whether the content of the permission to which consent has been granted has been updated, and display the specific screen in a case where the content of the permission has been updated.

2. The information processing system according to claim 1, wherein the predetermined process is a process of displaying an operation procedure for displaying a screen for accepting the operation indicating whether to grant consent to the content of the permission on the information processing apparatus.

3. The information processing system according to claim 1, wherein the predetermined process is a process of displaying a screen for accepting the operation indicating whether to grant consent to the content of the permission on the information processing apparatus.

4. The information processing system according to claim 1, wherein in a case where the acceptance unit accepts the operation indicating whether to grant consent to the content of the permission, the information processing apparatus transmits permission information reflecting the operation for the consent of the permission to the electronic apparatus.

5. The information processing system according to claim 1, wherein the electronic apparatus does not display a display screen for granting consent to the content of the permission.

6. The information processing system according to claim 1, wherein in response to a specific operation for using the web service, the electronic apparatus checks the permission information indicating whether the user has granted consent to the content of the permission, and executes a function using the web service in a case where the user has granted consent to the content of the permission.

7. The information processing system according to claim 1, wherein the reception unit obtains the state information in a case where an application for using the electronic apparatus is launched.

8. The information processing system according to claim 7, wherein the reception unit regularly receives the state information.

9. The information processing system according to claim 1, wherein the electronic apparatus is a printing apparatus, and the information processing apparatus is capable of transmitting a print job to the electronic apparatus.

10. A method of controlling an information processing system including an electronic apparatus and an information processing apparatus, the method comprising:

causing the electronic apparatus to perform in response to an operation for using a web service on the electronic apparatus, checking permission information indicating whether a user has granted consent to a permission content and, in a case where the user has not granted consent, performing control so as to display a specific screen indicating that a permission for information transmission from the electronic apparatus is required, and recording specific information indicating that the specific screen has been displayed by the performing control; and causing the information processing apparatus to perform receiving state information indicating a state of the electronic apparatus, in a case where the state information contains the specific information, performing control so as to perform a predetermined process for allowing the user to perform an operation on the information processing apparatus, the operation indicating whether to grant consent to a content of the permission for information transmission from the electronic apparatus, and accepting the operation indicating whether to grant consent to the content of the permission, wherein the information processing apparatus presents an error indication associated with the electronic apparatus in a case where the state information contains the specific information, and performs the predetermined process in a case where the user performs an operation for the error indication, and wherein the electronic apparatus performs control so as to communicate with a server system and check whether the content of the permission to which consent has been granted has been updated, and display the specific screen in a case where the content of the permission has been updated.

11. An information processing apparatus capable of communicating with an electronic apparatus having a display control unit that, in response to a specific operation for using a web service, performs control so as to display a specific screen indicating that a permission for information transmission from the electronic apparatus is required, and a recording unit that records specific information indicating that the display control unit has displayed the specific screen, the information processing apparatus comprising at least one memory and at least one processor which function as:

a reception unit that receives state information indicating a state of the electronic apparatus;

a control unit that, in a case where the state information received by the reception unit contains the specific information, performs control so as to perform a predetermined process for allowing a user to perform an operation on the information processing apparatus, the operation being an operation of granting consent to a content of the permission for information transmission from the electronic apparatus; and an acceptance unit that accepts a user operation indicating whether to grant consent to the content of the permission, wherein the information processing apparatus presents an error indication associated with the electronic apparatus in a case where the state information contains the specific information, and performs the predetermined process in a case where the user performs an operation for the error indication.

12. A method of controlling an information processing apparatus capable of communicating with an electronic apparatus having a display control unit that, in response to a specific operation for using a web service, performs control so as to display a specific screen indicating that a permission for information transmission from the electronic apparatus is required, and a recording unit that records specific information indicating that the display control unit has displayed the specific screen, the method comprising:

receiving state information indicating a state of the electronic apparatus;

in a case where the state information received by the receiving contains the specific information, performing control so as to perform a predetermined process for allowing a user to perform an operation on the information processing apparatus, the operation being an operation of granting consent to a content of the permission for information transmission from the electronic apparatus; and accepting a user operation indicating whether to grant consent to the content of the permission, wherein the information processing apparatus presents an error indication associated with the electronic apparatus in a case where the state information contains the specific information, and performs the predetermined process in a case where the user performs an operation for the error indication.

13. A non-transitory computer readable storage medium storing a program that functions in an information processing apparatus having at least one memory and at least one processor, and which is capable of communicating with an electronic apparatus having a display control unit that, in response to a specific operation for using a web service, performs control so as to display a specific screen indicating that a permission for information transmission from the electronic apparatus is required, and a recording unit that records specific information indicating that the display control unit has displayed the specific screen, wherein the program causes the information processing apparatus to function as:

a reception unit that receives state information indicating a state of the electronic apparatus;

a control unit that, in a case where the state information received by the reception unit contains the specific information, performs control so as to perform a predetermined process for allowing a user to perform an operation on the information processing apparatus, the operation being an operation of granting consent to a content of the permission for information transmission from the electronic apparatus; and an acceptance unit that accepts a user operation indicating whether to grant consent to the content of the permission, wherein the information processing apparatus presents an error indication associated with the electronic apparatus in a case where the state information contains the specific information, and performs the predetermined process in a case where the user performs an operation for the error indication.

14. An electronic apparatus capable of communicating with an information processing apparatus, the electronic apparatus comprising at least one memory and at least one processor which function as:

a display control unit that, in response to a specific operation for using a web service performed on the electronic apparatus, performs control so as to display a specific screen indicating that a permission for information transmission from the electronic apparatus is required;

a recording unit that records specific information indicating that the display control unit has displayed the specific screen;

a transmission unit that transmits state information containing the specific information to the information processing apparatus; and a reception unit that receives information indicating that a user has granted consent to the permission from the information processing apparatus, wherein the electronic apparatus performs control so as to communicate with a server system and check whether the content of the permission to which consent has been granted has been updated, and display the specific screen in a case where the content of the permission has been updated.

15. A method of controlling an electronic apparatus capable of communicating with an information processing apparatus, the method comprising:

in response to a specific operation for using a web service performed on the electronic apparatus, performing control so as to display a specific screen indicating that a permission for information transmission from the electronic apparatus is required;

recording specific information indicating that the specific screen has been displayed by the performing control;

transmitting state information containing the specific information to the information processing apparatus; and receiving information indicating that a user has granted consent to the permission from the information processing apparatus, wherein the electronic apparatus performs control so as to communicate with a server system and check whether the content of the permission to which consent has been granted has been updated, and display the specific screen in a case where the content of the permission has been updated.

16. A non-transitory computer readable storage medium storing a program that functions in an electronic apparatus and causes the electronic apparatus to function as:

a display control unit that, in response to a specific operation for using a web service performed on the electronic apparatus, performs control so as to display a specific screen indicating that a permission for information transmission from the electronic apparatus is required;

a recording unit that records specific information indicating that the display control unit has displayed the specific screen;

a transmission unit that transmits state information containing the specific information to the information processing apparatus; and a reception unit that receives information indicating that a user has granted consent to the permission from the information processing apparatus, wherein the electronic apparatus performs control so as to communicate with a server system and check whether the content of the permission to which consent has been granted has been updated, and display the specific screen in a case where the content of the permission has been updated.

* * * * *